Feb. 9, 1926.

J. A. PAINE 1,572,410

CANE HARVESTER

Filed June 11, 1919  6 Sheets-Sheet 2

Inventor
John A. Paine
by J. H. McCrue
attorney

Feb. 9, 1926.

J. A. PAINE

CANE HARVESTER

Filed June 11, 1919

Inventor
John A. Paine
by J. H. McCrady
Attorney Feb. 9, 1926. 1,572,410
J. A. PAINE
CANE HARVESTER
Filed June 11, 1919 6 Sheets-Sheet 5

Inventor
John A. Paine
by  Attorney

Patented Feb. 9, 1926.

1,572,410

UNITED STATES PATENT OFFICE.

JOHN A. PAINE, OF RICHMOND, VIRGINIA.

CANE HARVESTER.

Application filed June 11, 1919. Serial No. 303,328.

*To all whom it may concern:*

Be it known that I, JOHN A. PAINE, a citizen of the United States, residing at Richmond, in the county of Henrico and State of Virginia, have invented certain Improvements in a Cane Harvester, of which the following description, in connection with the accompanying drawings, is a specification, like reference characters on the drawings indicating like parts in the several figures.

This invention relates to automatic harvesting machinery of the type used for harvesting sugar cane, corn, and the like, and it is concerned particularly with the harvesting of sugar cane.

It is the universal practice today, as far as I have been able to learn, to perform the work of harvesting sugar cane on a commercial scale by hand. The harvesting operation comprises the cutting of the growing cane at a point substantially at the surface of the ground, stripping the leaves from the canes or stalks so cut, and cutting off the tops at any desired point.

The present invention aims to devise a thoroughly practical machine which will perform these operations automatically. Important features of the invention reside particularly in the general organization of the machine, in a novel means for gripping the growing cane while it is cut at the surface of the ground, in an improved cutting mechanism and in novel means for positioning the cane for the operation of cutting off the tops of the stalks.

The nature of the invention will be readily understood from the following description when read in connection with the accompanying drawings and the novel features will be particularly pointed out in the appended claims.

Referring now to the drawings,

Fig. 2ª is an angular view, partly in cross section, showing one wall of the hopper into which the cane drops;

Fig. 2ᵇ is a side elevation showing details of the driving mechanism for the cane grippers;

Preliminary to a detailed description of the machine shown in the drawings, it may be stated that sugar cane usually is planted in hills several feet apart in each direction, or in rows spaced apart by several feet, usually from five to seven feet. The machine shown is designed to straddle one of these rows or hills and comprises means for gripping the growing canes at a point several feet above the ground, a cutter for cutting the cane so gripped substantially at the surface of the ground, and a conveyor to which the stalks are delivered and which carries them to mechanisms that operate automatically to strip the leaves from the stalks and to cut off the tops of the stalks at the desired point. The detailed description of the several mechanisms of the machine will be taken up in substantially the order in which they have just been mentioned.

The mechanisms that operate on the cane are all mounted on a tractor which may be of any suitable type and which is driven by an engine that not only furnishes the motive power for the vehicle, but also the power for driving the different mechanisms of the machine. For clearness of illustration the details of construction of the tractor and the illustration of the engine have been omitted.

The mechanism that grips the canes preparatory to cutting them comprises two chains designated at 10 and 11, respectively, the chain 10 running over sprocket wheels 12, 13, 14 and 15, and the chain 11 over similar wheels 16, 17 and 18. The sprockets 12 and 16 are driven, the other sprockets simply being idlers or guiding sprockets, and the two sprockets 12 and 16 are mounted, respectively, on the upper ends of short shafts 20 and 21 which are driven through gear connections with vertical shafts 22 and 23, respectively, (see Figs. 2 and 2$^b$), these two shafts being driven through bevel gear connections with a horizontal shaft 24 having a sprocket wheel 25, Fig. 1, fast thereon at one end. This sprocket wheel is driven by a chain 26 running over another sprocket wheel 27 on a counter shaft that is driven by a chain 29 from the main shaft 30. A suitable clutch, not shown, is interposed between the main shaft 30 and the engine so that the power can be thrown on or off the shaft 30, as desired.

Figure 2:
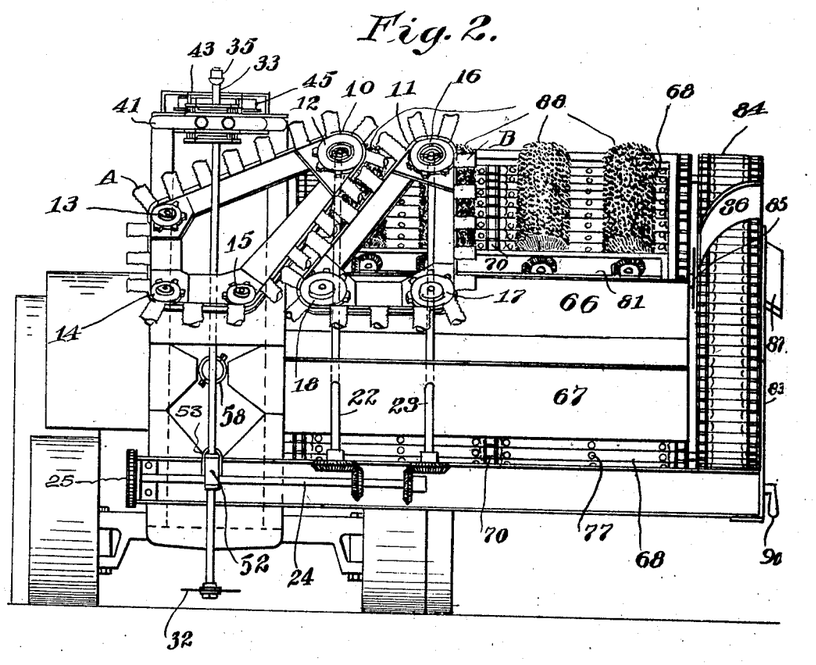
Fig. 2 is a front elevation of the machine shown in Fig. 1.
Figure 2A:
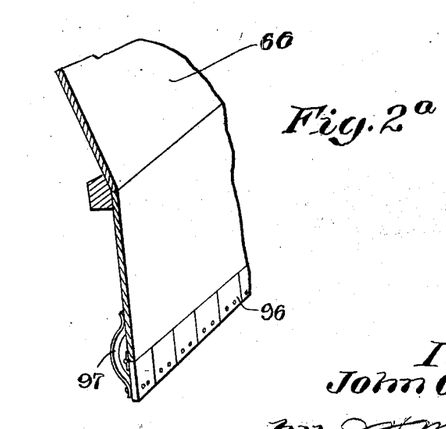
Figure 3:
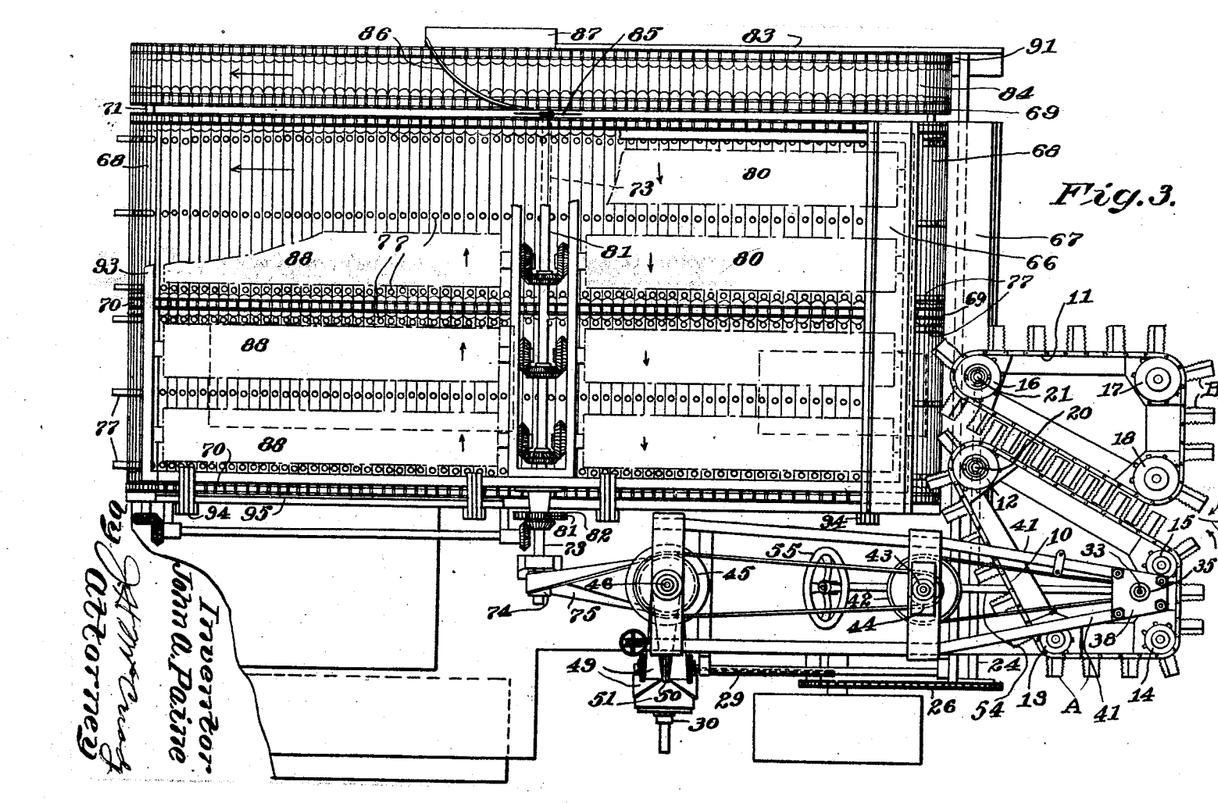
Fig. 3 is a plan view of the machine shown in Figs. 1 and 2.
Figure 14:
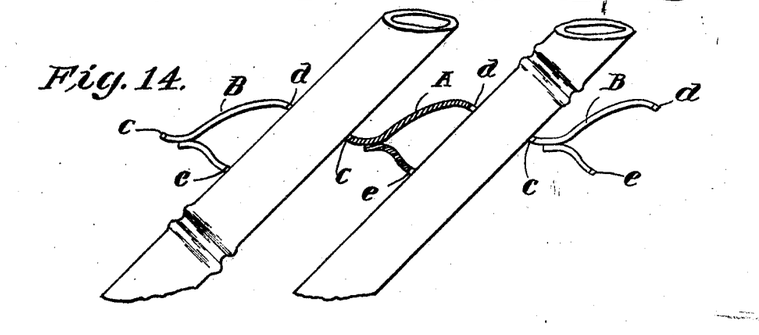
Fig. 14 is a diagrammatic view illustrating the manner in which the stalks are gripped while they are being cut.
Figure 15:
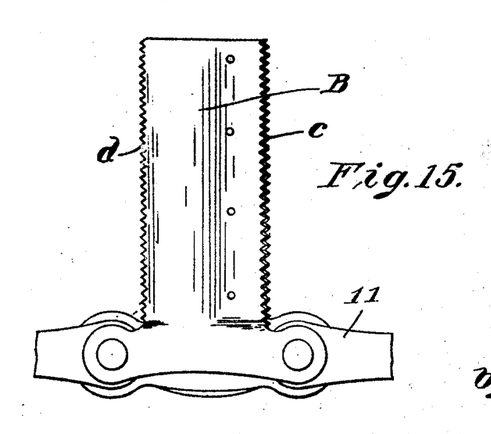
Fig. 15 is a plan view of one of the grippers shown in Fig. 14.
Figure 16:
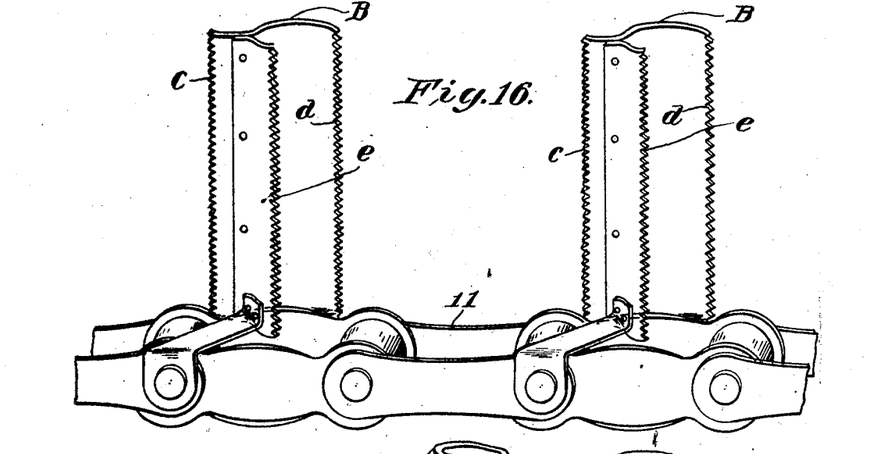
Fig. 16 is a perspective view showing certain of the grippers and the chain that carries them.

As clearly shown in the drawings, the chains 10 and 11 are mounted to travel in an inclined plane and they have two adjacent parallel runs between the sprockets 12, 15, 16 and 18, Fig. 3. Each chain carries a series of cane grippers, the grippers on the chain 10 being designated at A and those on the chain 11 at B. Each of these grippers is provided on one side with a notched edge $c$, Fig. 16, and on its opposite side with a pair of notched edges $d$ and $e$, respectively. The grippers are so spaced apart on the chains that when they arrive at the parallel portions of their runs they alternate or mesh with each other, as clearly shown in Figs. 2 and 3. In this position they will firmly grasp one or more stalks of cane, the stalks being held in the manner shown in Fig. 14. In this connection it should be noted that each stalk is engaged on one side by the edge $c$ of one of the grippers and on its opposite side by the notched edges $d$ and $e$ of the next gripper in the rear of that first mentioned. These edges $d$ and $e$ are located one above and the other below the level of the edge $c$ and, consequently, they make a three point contact with each stalk and thus hold it securely in a position nearly upright but preferably somewhat inclined rearwardly, that is, toward the rear of the machine.

The machine moves forward in the direction indicated by the arrow D in Fig. 3, the row or hill of cane on which the machine is operating being located substantially in line with the arrow. The canes, however, spread out above the ground so that the grippers A and B may engage the stalks at any points along the front reach of their travel, and they are located at such a height from the ground that they will come in contact with the stalks at a considerable distance above the ground, say, for instance, five (5) feet. By engaging the stalks at this height the stalks are enabled to bend laterally several feet without uprooting them, which obviously would be undesirable. The stalks so caught by the grippers are moved inwardly by the travel of the grippers toward each other along their forward paths of travel, and when the grippers approach their parallel runs and arrive in what has been referred to above as a meshing position, they will firmly grip the stalks in the manner above described.

While the stalks are thus held gripped in this manner they are cut off at a point substantially at the surface of the ground. This operation is performed by a rotary cutter 32, preferably consisting of a circular saw. The cutter is secured on the lower end of a vertical depending shaft 33 which is mounted in such a manner that the cutter can be raised or lowered or moved to and fro parallel to the ground at the will of the operator or attendant.

In order to give this shaft the desired range of movement, it is supported and driven by a novel mechanism. This mechanism comprises a ball 34 mounted in ball bearings which enable the ball to have a very wide range of angular movement. The shaft 33 is splined to this ball but can slide freely therethrough, the downward movement of the shaft being limited by a collar 35 adjustably secured on the shaft by a set screw. The detailed construction of this mechanism is best shown in Figs. 3 to 10, from which it will be seen that the ball is mounted between upper and lower sets of bearing balls 36 and 37 running in suitable races formed in brackets or bearing members 38 and 39 bolted on the forward ends of two pipes 40 which are rigidly secured to the frame of the machine. It will be evident from an inspection of Figs. 9 and 10 that the plates 38 and 39 can be adjusted toward and from each other by properly manipulating the nuts on the bolts that secure these plates in their operative positions. The central part of the ball 34 is machined to form a pulley face and a belt 41 running over this face and over a pulley 42, Fig. 1, drives the ball 34, and through it, the shaft 33 and cutter 32. This pulley 42 is mounted fast on a shaft 43 carrying a second pulley 44 which is belted to another pulley 45 fast on a vertical shaft 46. This shaft carries loose and fast pulleys 47 and 48, respectively, to receive a belt 49 running over horizontal idlers 50 on to a pulley 51 on the main driving shaft 30. A belt shifter (not shown) is used to throw the belt from one of the pulleys 47 and 48 to the other, as desired, to stop or start the operation of the cutter.

Figure 1:
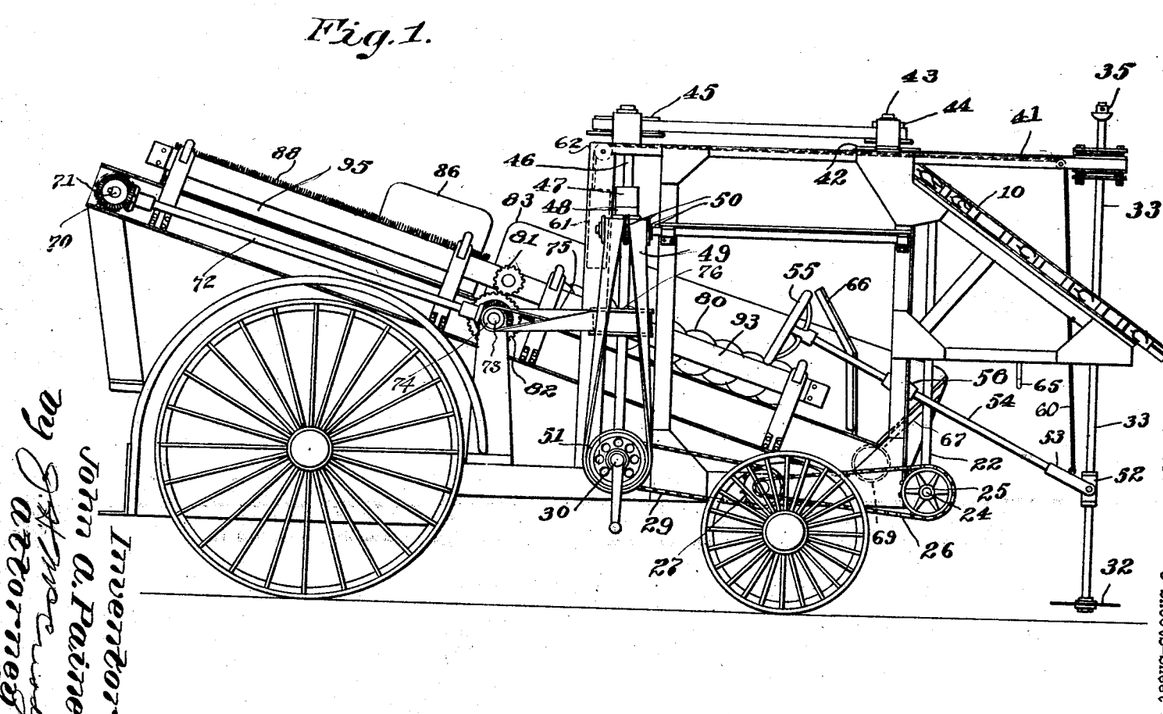
Figure 1 is a side elevation of a machine embodying the invention in the form at present preferred.
Figure 2B:
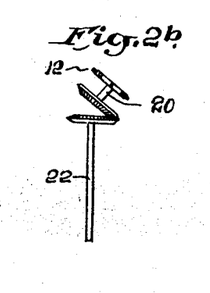
Figure 11:
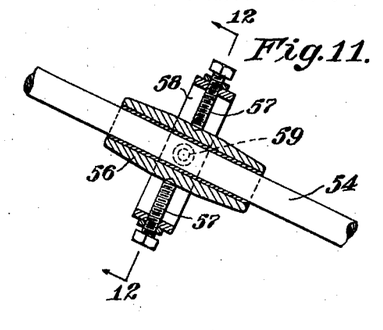
Fig. 11 is a vertical longitudinal cross sectional view through the joint that supports the controlling device for the cutter.
Figure 12:
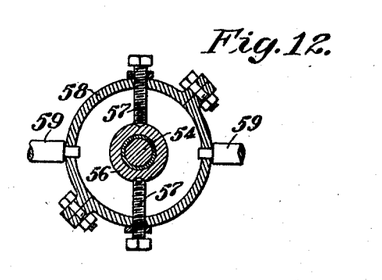
Fig. 12 is a cross sectional view on the line 12—12, Fig. 11.

In order to control the position of the cutter 32 and to enable the attendant to move this cutter as desired, a sleeve 52, Fig. 1, is loosely mounted on the shaft 33 between two collars secured on said shaft for adjustment into any convenient height, and this sleeve is straddled by a yoke 53, the ends of which are pivoted to the sleeve. This yoke is mounted fast on the forward end of a long rod 54 to the other end of which is fixed a hand-wheel 55. At an intermediate point this rod 54 is supported in a gimbal joint, preferably of the construction shown in Figs. 11 and 12. This joint comprises a sleeve 56 in which the rod 54 slides freely, the sleeve being pivotally supported in the conical ends of two set screws 57 which are threaded through a split ring 58 that also is pivotally supported in the ends of two bars 59 secured to the machine frame. This construction obviously enables the rod 54 to be swung about two axes at right angles to each other or to be moved longitudinally through the joint. In order to substantially counterbalance the weight of the shaft 33 and cutter 32, a small flexible cable 60 secured to the yoke 53 runs over suitable pulleys in one of the pipes 40 and is secured at its opposite end to a weight 61 movable up and down in a pipe 62 supported by the frame of the machine.

It will now be evident that when the machine is in operation the cutter 32 is under the control of the operator or attendant at all times. A seat may be located immediately back of the handwheel 55 in which the machine operator can sit with his hands on the handwheel where he has a clear view of the cutter. By moving the handwheel in the proper direction he can raise or lower the cutter as may be necessary to avoid inequalities in the surface of the ground and to cut the cane as close to the ground as possible; and he can also move the cutter to and fro in a plane substantially parallel with the surface of the ground to cause it to sever all the stalks in the hill or row for a width of several feet. When the machine is stopped the operator raises the cutter and places the rod 54 in a hook 65, Fig. 1, depending from a part of the machine frame. Inasmuch as the weight of the cutter 32 and shaft 33 are substantially counterbalanced, and since the shaft is supported on a joint moving universally in ball bearings, the adjusting movements of the cutter can be made very easily without any undue strain or effort on the part of the operator.

As the canes are gripped by the grippers A and B and cut off at the ground by the cutter 32, they are carried backwardly, with reference to the machine, and upwardly, the grippers holding the stalks in a slightly inclined position as above described. It will be seen from an inspection of Fig. 3 that the parallel run between the chains 10 and 11 is inclined laterally with reference to the direction of motion of the machine. Consequently, as the grippers carry the stalks upwardly, they hold them in a position inclined backwardly and laterally and when they reach the upper part of their parallel runs, where they release the stalks, the stalks will fall under the influence of gravity with their tops toward the upper part of the machine as it appears in Fig. 3. When the stalks are released they fall against the inclined wall 66, Fig. 1, of a hopper, having another wall 67 which lies in front of the wall 66. These walls direct the stalks into the bottom of the hopper. In this position the stalks rest on a portion of a long conveyor 68 guided at its opposite ends on suitable sprockets 69 and 70. In order to drive this conveyor the shaft 71 carrying the sprockets 70 is geared to another shaft 72, which, in turn, is geared to a shaft 73 extending transversely of the machine and carrying a pulley 74 that is driven by a quarter turn belt 75 from a pulley 76 fast on the shaft 46.

It will be seen that the conveyor elements are horizontal and that each element is provided with a series of short pins 77. The tops of these pins just clear the bottom of the rear wall 66 of the hopper, as shown in Fig. 1, and consequently the stalks lying in the bottom of the hopper drop into the spaces between the pins 77 and are carried by these pins under the lower edge of the wall 66, the conveyor moving in the direction indicated by the arrow in Fig. 3. A series of plates or small doors 96, Fig. 2ª, are hinged to the lower edge of the hopper wall 66, and each plate carries a curved spring 97 which bears against a portion of the wall above the hinge, so that these hinged plates can yield to allow an abnormally thick stalk to pass under the edge of the hopper, and at the same time they will tend to prevent more than one stalk passing under said edge at a time. The stalks picked up in this manner are brought first under a series of spiral members 80 driven by gear connections with a shaft 81. A gear connection 82, Fig. 5, connects the shaft 81 with the shaft 73 driven in the manner above described. The spiral members have teeth which act on the stalks carried by the conveyor 68 to move these stalks endwise toward the right, looking at the machine from the front. This movement pushes the tops of the stalks against a stop plate 83, Figs. 3 and 13, which plate is mounted for adjustment toward and from the conveyor 68 in order to facilitate the cutting of the tops at the desired point. These tops rest on a short section 84 of the conveyor which is driven by the same mechanism as the conveyor 68 and which is supported by sprockets mounted on the shafts which also support the sprockets of the conveyor 68. Consequently, this section of the conveyor moves in unison with the main section 68 and as the stalks are carried upwardly they are brought against a cutter 85, preferably consisting of a circular saw mounted fast on the shaft 73, which cuts off the tops of the stalks at a height depending on the adjustment of the plate 83. The tops so cut off are carried upwardly by the conveyor 84 against an inclined plate 86 which sweeps them off the conveyor and over an apron 87 on to the ground.

Figure 13:
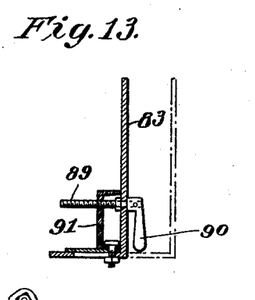
Fig. 13 is a cross sectional view showing an adjustment for the plate that engages the tops of the stalks after they have been delivered to the conveyor.

In order to enable the stop plate 83 to be adjusted toward and from the end of the conveyor section 84, it may be made in an L section, as shown in Fig. 13, and a suitable number of screws 89 each having a handle 90 fast thereon may be mounted to rotate in the stop plate 83 but held against longitudinal movement with reference thereto and threaded through a part 91 of the frame of the machine. Consequently, by turning the handles 90, Fig. 13 in the desired direction the plate 83 may be moved toward or from the conveyor 68. This adjustment will determine the length of the sections cut from the tops of the stalks.

Figures 4, 5, 6, 7:
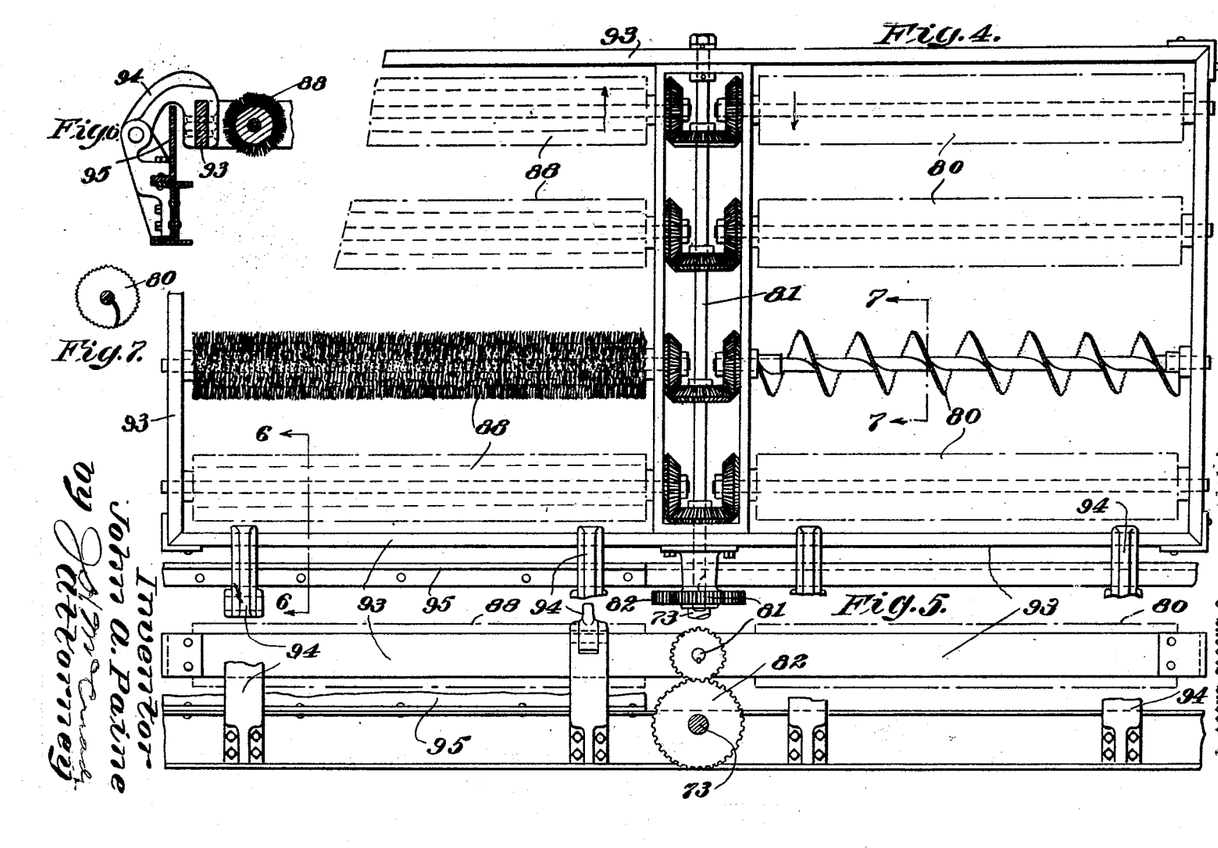
Fig. 4 is a plan view of the parts that operate on the stalks of cane after they have been delivered to the conveyor of the machine, and the supporting and driving mechanism for said parts.
Fig. 5 is an end view of the mechanism shown in Fig. 4, certain of the parts, however, being broken away.
Fig. 6 is a cross sectional view on the line 6—6, Fig. 4.
Fig. 7 is a cross sectional view on the line 7—7, Fig. 4.
Figure 8:
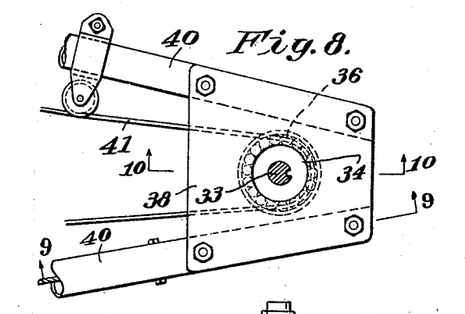
Fig. 8 is a plan view of certain parts of the supporting and driving mechanism for the cutter shaft.
Figure 9:
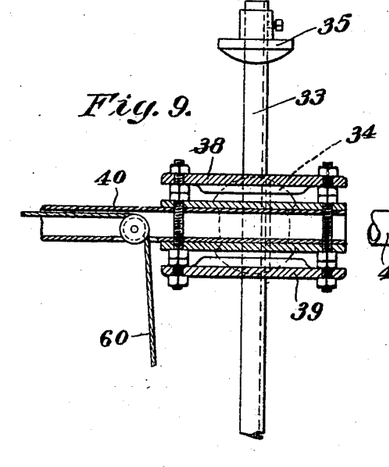
Fig. 9 is a cross sectional view on the line 9—9, Fig. 8.
Figure 10:
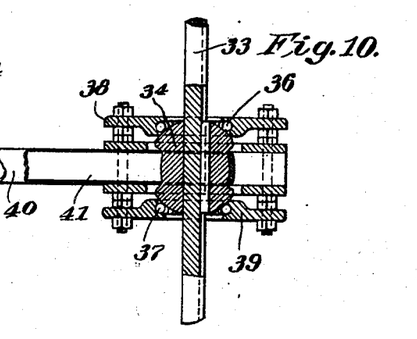
Fig. 10 is a vertical cross sectional view on the line 10—10, Fig. 8.

The action of the toothed members 80 on the stalks will remove some of the leaves, and in order to complete this operation the stalks are next carried under a series of strippers 88 which are rotated in the opposite direction from the members 80 by gear connections with the shaft 81. The strippers 88 preferably consist of large rotary brushes having wire or other relatively stiff bristles which drag downwardly toward the butts of the stalks and operate to strip off the leaves from the stalks. The drag of the bristles on the stalks will tend to force the stalks endwise in the opposite direction from that in which they are moved by the toothed members 80, but this movement is limited by the engagement of the butts of the stalks with the plate 95. This leaf stripping operation takes place while the stalks are being continuously moved backwardly toward the rear of the machine by the conveyor 68 and when the stalks arrive at the discharging end of this conveyor substantially all the leaves have been removed. The stalks drop off the end of the conveyor into a trailer (not shown) which is drawn by the machine, or they may be accumulated in a mechanism designed to dump them at intervals. In order to facilitate the making of repairs to the conveyor, or the members 80 and 88, and for the purpose also of facilitating the clearing away of any undue accumulation of leaves that may collect, the members 80 and 88 and their operating mechanism are mounted in a frame 93, Fig. 4, which is supported at one edge by suitable hinges or hangers 94, the construction of which is best shown in Fig. 6. The opposite edge of the frame rests on suitable stops and the pivots of the hangers 94 are so located that when the frame is swung upwardly the pinion of the gear connection 82 simply swings out of mesh with the gear that drives it.

The operation of the machine has been described so completely in connection with the foregoing description of construction, that any further statement as to operation is believed to be unnecessary.

While I have herein shown and described the best embodiment of the invention of which I am at present aware, it is obvious that this embodiment may be modified in many particulars without departing from the spirit or scope of this invention.

What is claimed as new is:

1. A cane harvesting machine having, in combination, means for cutting growing cane close to the ground, means for carrying the cut stalks of cane in a substantially upright position, a conveyor to which the stalks are delivered by said carrying means and on which the cane rests by gravity, and means for operating on the cane while it is on said conveyor.

2. A cane harvesting machine having, in combination, a conveyor having substantially horizontal travelling elements, means for operating on the cane carried by said conveyor, means for cutting the cane close to the ground, and additional means for carrying the cut stalks of cane in an inclined position toward said conveyor and delivering them to said conveyor.

3. A cane harvesting machine having, in combination, means for cutting growing cane at a point close to the ground, a conveyor, and mechanism for delivering the cut stalks of cane to said conveyor with the tops of the stalks all extending in a predetermined direction, said mechanism comprising means for carrying the cane in an inclined position and releasing it while in said position thereby causing it to fall by gravity in a predetermined direction on to the conveyor.

4. A cane harvesting machine having, in combination, means for cutting growing cane at a point close to the ground, a conveyor, a hopper from the bottom of which the conveyor takes the stalks of cane, and mechanism for delivering the cut stalks of cane to said hopper comprising means for carrying the cane to a point above said hopper and releasing it while the cane is in an inclined position causing it to fall in a predetermined direction into said hopper.

5. A cane harvesting machine having, in combination, means for cutting growing cane at a point close to the ground, a conveyor, and a second conveyor operative to carry the cut stalks of cane toward the first conveyor in an inclined position causing it to fall in a predetermined direction on to the first conveyor.

6. A cane harvesting machine having, in combination, means for cutting growing cane at a point close to the ground, a conveyor, and a second conveyor operative to carry the cut stalks of cane toward the first conveyor in a position inclined backwardly and laterally, whereby the cane is caused to fall by gravity in a predetermined direction on to the first conveyor.

7. A cane harvesting machine having, in combination, means for cutting growing cane at a point close to the ground, a conveyor, and a second conveyor operative to carry the cut stalks of cane toward the first conveyor in a position inclined backwardly and laterally, whereby the cane is caused to fall by gravity in a predetermined direction on to the first conveyor, and means for guiding the falling cane after its release by said second conveyor into the desired position on the first conveyor.

8. A cane harvesting machine having, in combination, a conveyor having substantially horizontal travelling elements, means for stripping the leaves from the stalks of cane carried by said conveyor, means for cutting off the tops of the stalks on said conveyor, and means for cutting the growing cane and delivering it to said conveyor.

9. A cane harvesting machine having, in combination, a conveyor for supporting the stalks of cane, means for cutting growing cane and delivering it to said conveyor, means for operating on the cane on said conveyor to move the stalks of cane endwise, a stop against which the cane is so moved, and a cutter for cutting off the tops of the cane while they are in contact with said stop.

10. A cane harvesting machine having, in combination, a conveyor for supporting the stalks of cane, means for cutting growing cane and delivering it to said conveyor, means for operating on the cane on said conveyor to move the stalks of cane endwise, a stop plate against which the tops of the stalks are forced by said endwise movement, and a power driven cutter against which the stalks are carried by said conveyor while the top of the stalks are held in contact with said plate.

11. A cane harvesting machine having, in combination, a divided conveyor, means for cutting growing cane and delivering it to said conveyor, a power driven cutter mounted between the sections of said conveyor, a stop positioned at one side of said conveyor, and means for acting on the cane on said conveyor to move it endwise to force the tops of the stalks against said stop before the conveyor carries said stalks into contact with said cutter, whereby the cutter will operate to cut off a substantially predetermined length from the top of each stalk.

12. A cane harvesting machine having, in combination, a conveyor in a substantially horizontal position for supporting the stalks of cane, means for cutting growing cane and delivering it to said conveyor, and means to which the cane is carried by the conveyor operative to strip the leaves from the cane while it is on said conveyor.

13. A cane harvesting machine having, in combination, a conveyor, means for cutting growing cane and delivering it to said conveyor, power driven means operative to move the cane on said conveyor endwise, a stop against which the tops of the stalks of cane are moved by said means, and a rotary cutter for cutting off the tops of the stalks while they are in contact with said stop.

14. A cane harvesting machine having, in combination, a conveyor, means for cutting growing cane and delivering it to said conveyor, power driven means operative to move the cane on said conveyor endwise, a stop against which the tops of the stalks of cane are moved by said means, and a rotary cutter for cutting off the tops of the stalks while they are in contact with said stop, and additional driven means operative to strip the leaves from the stalks on said conveyor after the tops have been severed.

15. A cane harvesting machine, having means for gripping stalks of growing cane at a considerable distance above the ground, and a cutter arranged to cut said stalks at a point close to the ground after they have been so gripped and while they are still held gripped.

16. A cane harvesting machine, having means for gripping stalks of growing cane at a considerable distance above the ground, a cutter for cutting the stalks so gripped at a point close to the ground, and means enabling the attendant to move said cutter to and fro substantially parallel to the ground while the machine is in operation.

17. A cane harvesting machine, having means for gripping stalks of growing cane, a power driven cutter for severing the cane below the point at which it is so gripped, and supporting and operating means for said cutter enabling the attendant to adjust the position of the cutter in a plurality of directions while the machine is in operation.

18. In a cane harvesting machine, a power driven cutter for severing the cane substantially at the surface of the ground, and supporting and operating means for said cutter enabling the attendant to raise and lower the cutter at will and to move it to and fro substantially parallel to the ground while the machine is in operation.

19. In a cane harvesting machine, a rotary cutter for severing the cane substantially at the surface of the ground, a depending shaft supporting said cutter, means for driving said shaft, and supporting and controlling means for said shaft enabling an attendant to raise or lower the cutter at will and to move the cutter to and fro in a plane substantially parallel to the ground while the machine is in operation.

20. In a cane harvesting machine, a rotary cutter for severing the cane below the point at which it is gripped, a depending shaft supporting said cutter, a ball joint supporting said shaft, and means having a driving connection with said shaft at said joint to rotate the shaft.

21. In a cane harvesting machine, a rotary cutter for severing the cane substantially at the surface of the ground, a depending shaft supporting said cutter, a ball joint supporting said shaft and a belt operating on said joint to drive said shaft.

22. In a cane harvesting machine, a rotary cutter for severing the cane substantially at the surface of the ground, a depending shaft supporting said cutter, a ball joint supporting said shaft and through which said shaft is slidable, and a belt operating directly on said ball joint to drive said shaft.

23. In a cane harvesting machine, a rotary cutter for severing the cane substantially at the surface of the ground, a depending shaft supporting said cutter, a ball joint supporting said shaft and through which said shaft is slidable, means having a driving connection with said joint to rotate the shaft, and a counter weight connected with said shaft and substantially balancing the weight of said shaft and cutter.

24. In a cane harvesting machine, a rotary cutter for severing the cane substantially at the surface of the ground, a depending shaft supporting said cutter, means for supporting and driving said shaft including a universal joint enabling the cutter to be moved to and fro parallel to the ground, a controlling rod connected with said shaft, and a swivel joint supporting said rod, whereby the attendant is enabled to adjust said cutter at will during the operation of the machine.

25. In a cane harvesting machine, two endless chains having adjacent parallel runs, and cane grippers carried by said chains and spaced apart to cause the grippers on the two chains to mesh with each other while they travel along said parallel runs, each of said grippers having a toothed edge on one side and a pair of toothed edges on its opposite side, whereby the single edge of each gripper of one set cooperates with the pair of edges of the next adjacent gripper of the opposite set to grasp a stalk of cane with a three point contact while the grippers travel along said parallel runs.

26. In a cane harvesting machine, two endless chains having adjacent parallel runs, and cane grippers carried by said chains and spaced apart to cause the grippers on the opposite chains to mesh with each other and to grasp stalks of cane between them while they travel along said parallel runs, said grippers being constructed to hold said stalks in an inclined position.

27. In a cane harvesting machine, two endless chains having adjacent parallel runs, and cane grippers carried by said chains and spaced apart to cause the grippers on the two chains to mesh with each other while they travel along said parallel runs, each of said grippers having a toothed edge on one side, and a pair of toothed edges on its opposite side, whereby the single edge of each gripper of one set co-operates with the pair of edges of the next adjacent gripper of the opposite set to grasp a stalk of cane while the grippers travel along said parallel runs, the single edge in engagement with one side of a stalk lying between the levels of the edges engaging the opposite side of said stalk.

28. In a cane harvesting machine, two endless chains having adjacent parallel runs, and cane grippers carried by said chains and spaced apart to cause the grippers on the two chains to mesh with each other while they travel along said parallel runs, each of said grippers having a toothed edge on one side and a pair of toothed edges on its opposite side, the two edges of said pair lying one above the other and the upper edge projecting beyond the lower edge, whereby the single edge of each gripper on one set cooperates with the pair of edges of the next adjacent gripper of the opposite set to grasp a stalk of cane when the grippers are in their meshing position and to hold said stalk in an inclined position.

29. In a cane harvesting machine, two endless chains having adjacent parallel runs, and cane grippers carried by said chains and spaced apart to cause the grippers on the opposite chains to mesh with each other and to grasp stalks of cane between them while they travel along said parallel runs, said grippers being constructed to hold said stalks in an inclined position and said parallel portions of the runs of said edges lying diagonally with reference to the direction of motion of the machine whereby said stalks will be held in a position inclined backwardly and laterally while they are being carried by said grippers.

30. In a cane harvesting machine, the combination of two endless chains having adjacent parallel runs, cane grippers carried by said chains and spaced apart to cause the grippers on the opposite chains to mesh with each other and to grasp stalks of cane between them while they travel along said parallel runs, means for supporting said chains with said parallel runs inclined upwardly and backwardly, and cane cutting means mounted below the forward ends of said parallel runs.

In testimony whereof I have signed my name to this specification.

JOHN A. PAINE.

Certificate of Correction.

It is hereby certified that in Letters Patent No. 1,572,410, granted February 9, 1926, upon the application of John A. Paine, of Richmond, Virginia, for an improvement in "Cane Harvesters," an error appears in the printed specification requiring correction as follows: Page 5, lines 91 and 92, claim 12, strike out the words "in a substantially horizontal position" and insert the same to follow after the word "cane" and before the comma in line 93, same claim; and that the said Letters Patent should be read with this correction therein that the same may conform to the record of the case in the Patent Office.

Signed and sealed this 16th day of March, A. D. 1926.

[SEAL.]

M. J. MOORE,
*Acting Commissioner of Patents.*